United States Patent Office 2,769,699
Patented Nov. 6, 1956

2,769,699

GRINDING WHEELS

Frank J. Polch, Princeton, Mass., assignor to Norton Company, Worcester, Mass., a corporation of Massachusetts No Drawing. Application June 2, 1951,
Serial No. 229,647

6 Claims. (Cl. 51—298)

The invention relates to grinding wheels and other solid abrasive bodies and more especially to so-called snagging wheels which are used to grind and to cut off the gates and risers on castings and to put a smooth surface on billets so that as the result of subsequent rolling or drawing operations defects will not occur in the final product. This application is a continuation in part of my copending application Serial No. 174,114 filed July 15, 1950, now abandoned.

One object of the invention is to provide a superior grinding wheel for the grinding of various kinds of steel. Another object of the invention is to provide a superior snagging wheel. Another object of the invention is to provide grinding wheels useful for most grinding operations where wheels having crystalline alumina abrasive are currently used but giving results superior to those given by such crystalline alumina containing wheels. Another object is to provide superior abrasive products and grinding wheels for more efficient and more economical grinding of many different materials.

Another object of the invention is to provide a more efficient grinding wheel for many grinding operations where efficiency is measured by material removed divided by wheel wear. Another object of the invention is to provide an improved grinding wheel as determined by the quality number where the quality number is the square of the material removed in pounds per hour divided by the wheel wear in cubic inches per hour.

Another object of the invention is to provide organic polymer bonded grinding wheels of superior quality, such grinding wheels being of the group which are bonded with any of phenolic resin, aniline formaldehyde resin, natural rubber and the rubber substitutes butadiene-acrylonitrile and butadiene-styrene. The aforesaid group of organic bonds is a related group since each member thereof makes a tough hard bond for the production of durable grinding wheels for grinding hard materials such as various steels. The rubber includes sufficient sulphur to make a hard rubber and the rubber substitute materials are sufficiently cross-linked for the same purpose. These bonds are used for the manufacture of the vast majority of organic bonded grinding wheels. The rubber will be hard enough if the sulphur is one-third of the weight of the rubber and each of butadiene-acrylonitrile and butadiene-styrene polymers will also be hard enough if the sulphur is at least one-third of the weight of the butadiene-acrylonitrile or butadiene-styrene. However I prefer to have the sulphur equal one-half the weight of the rubber and in the case of the polymers I prefer to have the sulphur equal 37% of the weight of the butadiene-acrylonitrile or butadiene-styrene since these figures represent saturation. In the case of the phenolic resin and in the case of the aniline formaldehyde resin it is sufficient if there is enough cross-linking so that these resins are thermo-irreversible as then they will be sufficiently hard.

Other objects will be in part obvious or in part pointed out hereinafter.

As conducive to a clearer understanding of the present invention, it is observed that very likely the earliest grinding wheels were made out of natural sandstone. Sandstone consists of particles of quartz bonded together with softer minerals. Quartz has a hardness of 7 on Mohs' scale. Mohs' scale has ten items of which the last five are as follows:

TABLE I

Mohs' scale of hardness

| | |
|---|---|
| Feldspar | 6 |
| Quartz | 7 |
| Topaz | 8 |
| Corundum | 9 |
| Diamond | 10 |

Also very long ago grinding was done by flexible discs, such as leather discs, coated on the periphery with emery and oil. It was probably later on that glue was first used to hold the emery more firmly to the discs. Corundum is the mineral name for crystalline alumina. $Al_2O_3$ and varieties of corundum are sapphire and ruby. Emery is a mixture of corundum, magnetite, hematite, quartz and spinel in varying proportions and has a hardness anywhere from 7 to 9 on Mohs' scale.

More than fifty years ago Edward G. Acheson synthesized a compound from carbon and silicious material which proved to be silicon carbide SiC. In the purer form this is considered to have a hardness of about 9.1 on Mohs' scale. Shortly thereafter crystalline alumina was made by fusing bauxite with coke as a reducing agent in an electric furnace. This material now widely used as an abrasive is variously referred to as artificial corundum, crystalline alumina, fused alumina, crystalline aluminum oxide and fused aluminum oxide. Of recent years the great bulk of grinding has been done with grinding wheels containing as the abrasive either silicon carbide or fused alumina. Some natural corundum is still used today and for the grinding of metal carbides grinding wheels containing diamond abrasive are used.

For the abrasive material for the manufacture of grinding wheels I provide fused zirconia which can equally well be called fused zirconium oxide. Zirconia, otherwise zirconium oxide, has the chemical formula $ZrO_2$. This fused zirconia is quite different in its physical properties, especially in its abrasive properties, from the mineral baddeleyite as found in nature, usually in the form of small pebbles or particles found in the beds of streams. South America is the source of much of this material baddeleyite and the pebbles are called favas. Furthermore fuzed zirconia is quite different from zirconia, relatively pure or not, made by chemical methods usually involving precipitating the $ZrO_2$ from a solution. Much of the zirconia used in commerce has been made by the chemical treatment of zircon sand. Zircon, whose empirical formula is $Zr \cdot SiO_4$ is zirconium silicate and is found in various parts of the world, usually occurring as beach sand and the available supply of zircon is much greater than that of baddeleyite. However I have found that neither baddeleyite nor zirconia produced by chemical methods has the physical properties with resultant abrasive properties of fused zirconia. "Fused" zirconia is a term implying that the zirconia was melted and then, of course, allowed to solidify. Although this appears to be defining something by reference to a process there is in fact no other designation for the material which, as a material, has remarkably different properties from the aforesaid baddeleyite and chemically prepared zirconia.

In this connection it is noted that the term "fused alumina" and the term "fused aluminum oxide," these two terms meaning exactly the same thing, have been used for a long time to differentiate the product of the electric furnace from corundum which is the mineral $Al_2O_3$. Fused alumina is of course $Al_2O_3$. In that case also there was no other way to differentiate the two products except by resorting to another term equally denoting the result of a process, to wit, "artificial corundum."

But I find this great difference between the relationship of fused alumina to corundum on the one hand and the relationship of fused zirconia to baddeleyite and chemical zirconia on the other hand, in that each of corundum and fused alumina is a good abrasive material and is widely used as such whereas, on the other hand, baddeleyite and chemical zirconia are found to be wholly inferior to fused alumina as an abrasive but fused zirconia is found to be remarkably superior to fused alumina as an abrasive in many practical grinding operations. I know of no case in which natural baddeleyite or chemical zirconia is at all competitive with fused alumina as an abrasive material for the manufacture of grinding wheels. The use of such materials for the manufacture of grinding wheels has been merely sporadic and of no real consequence. On the other hand, as will be hereinafter shown fused zirconia presents marked advantages over fused alumina as an abrasive material in grinding wheels even though it has a hardness of only about 7.6 on Mohs' scale. This is surprising.

Fused zirconia for the manufacture of grinding wheels in accordance with this invention can be made in an electric arc furnace of the type disclosed in U. S. Letters Patent No. 775,654 to Aldus C. Higgins patented November 22, 1904. Furnaces of this type comprising iron shells cooled all over with a cascade of water have been in use practically ever since the date of the above patent and are well known to electro-chemists and therefore need not further be described herein. A furnace mixture of zirconia ore, coke, iron borings and calcium oxide (lime CaO) is prepared. Various zirconia ores or partially purified zirconia powders can be used. The ores are mainly the zircon ores and the zirkite ores. Analyses of these ores are usually within the following range:

TABLE II

| | Percent |
|---|---|
| $ZrO_2$ | 65 to 95 |
| $SiO_2$ | 3 to 35 |
| $Fe_2O_3$ | 0.1 to 6 |
| $TiO_2$ | 0.1 to 2 |

The quantity of carbon provided in the furnace mixture should be two-thirds of the theoretical quantity of carbon required completely to reduce the silica plus 100% of the theroretical quantity required to reduce all the other oxides (except zirconia) to metal plus about 20% excess over all of these quantities. This quantity can be varied from the above with no excess to the above with 40% excess. The reason why there is provided only two-thirds of the theoretical quantity of carbon required completely to reduce the silica is that it has been found that about one-third of the silica is volatilized during the furnacing operation. On the other hand the excess mentioned is provided because some of the coke is used up by combining with oxygen other than that provided by the oxides to be reduced.

A particular zirconia ore yielded an analysis as follows:

TABLE III

| | Parts |
|---|---|
| Ignition loss | 1.17 |
| $ZrO_2$ | 74.35 |
| $SiO_2$ | 18.25 |
| $Fe_2O_3$ | 3.19 |
| $TiO_2$ | 1.50 |
| Total | 98.46 |

Other typical ores which have been used were found to yield analyses as follows:

TABLE IV

| | Baddeleyite Favas Type | Zirkite | Zircon |
|---|---|---|---|
| | Percent | Percent | Percent |
| $ZrO_2$ | 81.60 | 70-79 | 65-67 |
| $SiO_2$ | 6.27 | 12-18 | 30-34 |
| $Fe_2O_3$ | 5.54 | 3-6 | 0.1-0.5 |
| $TiO_2$ | 1.00 | 1-2 | 0.1-1.0 |

Making the stoichiometric calculations and using the above rule of two-thirds and the above rule of 20% excess the amount of carbon required according to the formula for the ore of Table III would be about 6.7% of the weight of the ore. The exact quantity of coke required would depend on the amount of fixed carbon in the particular coke being used.

The quantity of iron, in the form of borings or otherwise, should be enough to form with the silicon that is reduced from silica a ferro-silicon having an iron content of from 75% to 85%. It will be remembered that about one-third of the silica volatilizes so the amount of silicon produced is two-thirds of that present in the silica content of the ore. The purpose of the iron is to combine with the silicon to form a ferro-silicon alloy which has a much higher specific gravity than elementary silicon and therefore will go to the bottom of the furnace and, after solidification, form a ferro-silicon button containing also other reduction products that can readily be separated from the rest of the ingot. If there were no iron in the mix the silicon would be present as such and having a lower specific gravity not all of it would go into the button. In making the above calculation as to the quantity of iron to use, the free iron produced by reduction of the iron oxide should be taken into account so that the 75% to 85% is the total iron, both that which will be produced by reduction of the oxide and that which should be added in the form of borings or otherwise. Therefore the amount of iron to add is enough to make with two-thirds of the silicon present in the ore a ferro-silicon having an iron content of from 75% to 85% minus the amount of iron obtained by the reduction of the iron oxide in the ore to iron and this of course must take into account that, as hereinafter shown, a small percentage of iron oxide remains in the final product.

The quantity of lime as a stabilizing agent to be added should be from 3% to 6% of the amount of $ZrO_2$ in the ore. The stabilizing agent in the range given causes the zirconia to crystallize predominantly in the cubic system but when less of the stabilizing agent is used the crystals are predominantly monoclinic.

As a guide to carrying out the invention in practice but not as a limitation thereto I will give a clear description of the mechanical steps in carrying out the furnace operation. A regular alumina electric arc furnace can be used, this type of furnace being of a size to produce, in the case of alumina, an ingot of about eleven tons. This is a common type of electric arc furnace. About two feet of mixture is placed on the carbon bottom of the furnace and then bridges of coarse coke are placed immediately under the electrodes to form a path between the electrodes or, in case three electrodes are used, paths from each electrode to each other. The electrodes are lowered until they make contact with the coke bridges and current will flow across these bridges until sufficient of the mixture has melted to carry the power load. Furnace mixture is then added from time to time so as to keep only a thin layer of unmelted mixture on top of the gradually enlarging pool or bath of molten material until finally the electric furnace is full of molten material. Then the electrodes are removed and the furnace contents allowed to cool. When the ingot has solidified sufficiently so that there is no danger of molten material flowing from it through a crack or otherwise, the furnace shell is lifted from the pig and then after further cooling the pig is broken up by means of sledge hammers or skull crackers. The metallic button consisting mostly of ferro-silicon but with some titanium or other reduced products is found on the bottom of the ingot and this is removed for sale as a by-product or other use. The remainder of the product will be found to analyze about as follows:

TABLE V

|  | Percent |
|---|---|
| $ZrO_2+CaO$ | 97 to 99+ |
| $SiO_2$ | 0.14 to 0.70 |
| $Fe_2O_3$ | 0.20 to 0.70 |
| $TiO_2$ | 0.30 to 1.00 |

The broken material is hand sorted to remove remnants of unfused material and of ferro-silicon and then the good material is crushed to grit, preferably to grit sizes No. 4 and finer, then magnetically separated to remove any metal which may have been introduced during crushing or metal which was not removed during sorting. This product is now calcined under oxidizing conditions at a temperature of 1400° C. to 1450° C. for several hours to remove any traces of residual carbon or reduced oxides. The material is now ready for manufacture into grinding wheels.

The material made as above described is stabilized fused zirconia made in accordance with U. S. Letters Patent No. 2,535,526 to my colleagues A. H. Ballard and D. W. Marshall, granted December 26, 1950. If the same furnacing operation were carried out in the same way using the same furnace charge except omitting the lime an unstabilized fused zirconia would be produced. Either can be used in this invention. Fused zirconia not containing any lime or other stabilizing agent is monoclinic whereas when 5% of lime on the amount of $ZrO_2$ in the ore is included in the furnace mixture the crystals are cubic. For the purpose of making refractory articles such as bricks and other shapes for use in high temperature furnaces predominantly cubic zirconia is preferred because the monoclinic form of zirconia when made into refractory articles spalls, checks, crazes or fractures when used in high temperature furnaces. This is because the monoclinic form of zirconia undergoes a sharp change of volume at a temperature somewhere near 1000° C. and refractory articles made of such monoclinic zirconia, in cooling from above 1000° C. to a temperature well below that figure, crack, spall, check or fracture. The explanation is that the monoclinic zirconia changes its crystal habit into the cubic form at some temperature near 1000° C. and the crystals again become monoclinic on loss of heat at about the same temperature thus producing the cracking etc. But if the zirconia has about 5% of lime therein the crystals, starting out as cubic crystals as the fusion solidifies, remain cubic right down to room temperature. For refractory purposes it has been found that from 3% to 6% of lime on the amount of $ZrO_2$ in the ore in the furnace mixture gives satisfactory results.

This material, namely the stabilized fused zirconia with the aforesaid 3% to 6% of lime is readily available and can be used in the invention. But I have found that unstabilized fused zirconia, containing no lime as a deliberate addition although perhaps a fraction of a percent as an unavoidable impurity gives even better results when the material is used as an abrasive. The particular reason, therefore, for mentioning the stabilized species of fused zirconia is because this material is more readily available. Furthermore zirconia can also be stabilized with magnesia or with other alkaline earths to wit. barium oxide and strontium oxide. Less than 3% of any of these materials can be present according to the invention and thus the crystalline zirconia may be all cubic or all monoclinic or partly cubic and partly monoclinic in any proportions and may contain anywhere up to 6% of alkaline earth oxide on the amount of $ZrO_2$ in the ore in the furnace mixture which is to all intents and purposes the same as on the amount of $ZrO_2$ in the product. In every case the alkaline earth oxide up to 6% is present in solid solution in the fused zirconia crystals.

It is further pointed out that it is almost impossible to distinguish zirconia from hafnia, otherwise known as hafnium oxide $HfO_2$, by ordinary methods of analysis. The material which herein has been referred to as zirconia is therefore $xZrO_2+yHfO_2$ and this is the material which is commonly referred to as zirconia. However y is small as the Scientific American for June 1951 says that zirconium metal made from the same ores as herein mentioned contains only about .5% to 1.5% of hafnium. Entirely apart from the hafnia, impurities of up to 3% can be tolerated. These will usually be other oxides. The hafnium oxide is not considered to be an impurity and neither is the stabilizing agent calcium oxide or other alkaline earth oxide. It is possible to make material which is better than 99% pure. The lime stabilized fused zirconia which I have used was better than 98% pure.

Fused zirconia, whether stabilized or not, has a hardness of about 7.65 on Mohs' scale. The hardness of this and other materials mentioned herein is shown on the Knoop scale, using 100 grams load, for purposes of comparison as follows:

TABLE VI

*Hardness on the Knoop scale using 100 gram load*

| Material | Range of Hardness in Many Tests | Average Hardness |
|---|---|---|
| Quartz |  | 820 |
| Natural Baddeleyite | 730 to 1,090 | 880 |
| Fused Zirconia | 1,090 to 1,270 | 1,160 |
| Topaz |  | 1,340 |
| Zircon |  | 1,340 |
| Corundum or Good Grade of Fused Alumina | 1,280 to 1,410 | 2,000 |
| Silicon Carbide |  | 2,500 |
| Diamond | (¹) | (¹) |

¹ The hardness of diamond has never been exactly determined (because there is nothing harder with which to scratch it) but is estimated to be on this scale with 100 gram load over 6,000 and perhaps as high as 10,000.

Fused zirconia as above described, whether stabilized or not and whether the crystals are cubic or monoclinic, is bonded with organic bond selected from the group consisting of phenolic resin, aniline formaldehyde resin, natural rubber, butadiene-styrene polymer, butadiene-acrylonitrile polymer and mixtures thereof.

EXAMPLE I

Two identical wheels were made, that is to say identical excepting one had fused alumina abrasive and the other had stabilized fused zirconia as the abrasive, the stabilized fused zirconia having been made as above described with about 5% of lime. In grade and structure these wheels had zero porosity (as commercially reckoned) and 54% by volume of abrasive, wherefor the percentage of bond by volume was 46%. In this connection everything which is neither abrasive nor porosity is considered to be bond. The wheels were 16" in diameter and 2" thick with a 6" central hole and were used to grind stainless steel, the common 18–8 variety, meaning 18% chromium and 8% nickel. For years the only abrasive used to any considerable extent for grinding stainless steel has been fused alumina. The bond in these wheels was standard phenolic resin as used by one manufacturer for many years, being procured in powdered reactive form and consisting of phenol formaldehyde condensation product containing a little creosol-formaldehyde and marketed under the brand designation BR2417.

The abrasive grains in each case being of No. 16 grit size were first wet with furfural in the amount of 15 cubic centimeters of furfural to each pound of phenolic resin, and then the bond including fillers, anti-swelling agent, and cross-linking agent was added. The fillers were 15% iron pyrites $FeS_2$ and 15% potassium fluoborate $KBF_4$, the anti-swelling agent was 8% lime $CaO$ and the cross-linking agent was 10% vinylidine dichloride, the above proportions being by volume on the total bond plus fillers plus agents. The abrasive wet with furfural was placed in a mixer and then the powdered mixture of resin bond, fillers and agents was added and later neutral creosote oil was added in the amount of 20 cubic centimeters per pound of the resin. This mixture was molded in a hot press at 160° C. for one hour and thereafter given a soaking bake at 175° C. These ingredients and the above procedure have been used for some time for the manufacture of snagging wheels for the grinding of 18–8 stainless steel and are known to give excellent results.

The grinding was done with a standard type swing frame grinder using 140 pounds pressure, with the wheels moving at 9500 surface feet per minute (peripheral velocity). The grinding results are shown in Table VII wherein the wheel having the fused alumina abrasive is designated by the chemical formula $Al_2O_3$ and the wheel having the stabilized fused zirconia is designated by the chemical formulae $ZrO_2+CaO$.

TABLE VII

| Wheel | Wheel Wear, Cubic Inches Per Hour WW | Material Removed, Pounds Per Hour MR | Quality $(MR)^2$ $\overline{(WW)}$ | Efficiency $\dfrac{MR}{WW}$ |
| --- | --- | --- | --- | --- |
| $Al_2O_3$ | 25.6 | 21.3 | 18 | .833 |
| $ZrO_2+CaO$ | 13.5 | 29.0 | 62 | 2.15 |

In the above table the quality number, as indicated, is the square of the material removed divided by the wheel wear. In this connection the fact that cubic inches of grinding wheel has no simple relationship to pounds of steel is immaterial because other wheels have been tested in the same manner for years. By squaring the pounds of material removed per hour recognition is given to the fact that the value of a grinding wheel does not depend only on the total amount of steel the grinding wheel will grind but also on how fast it will grind since the operator's time has to be paid for and overhead is always a significant cost factor in any steel mill. By the experience of years it has been found that for snagging operations on stainless steel using wheels bonded with phenolic resin the quality number obtained as above explained is a true indication of the value of the wheel. The efficiency as shown in Table VII represents the relative value of the wheel without giving any consideration to the operator's pay nor to the overhead in the steel mill where the wheel is used, and so therefore the efficiency number has less value but since it has been used in comparing wheels heretofore it is given. By both comparisons, however, it will be seen that the wheel having stabilized fused zirconia as the abrasive was quite superior to the standard wheel having fused alumina as the abrasive.

EXAMPLE II

Two identical wheels were made, that is to say identical excepting one had fused alumina abrasive and the other had stabilized fused zirconia as the abrasive, the same zirconia as in the case of Example I. In grade and structure these wheels had 56% by volume of abrasive 26% by volume of bond, and 18% by volume of porosity. The wheels were 16" in diameter and 2" thick with a 6" central hole and were used to grind 18–8 stainless steel. The bond in these wheels was the same phenol-formaldehyde as in the case of Example I.

The abrasive grains in each being of No. 16 grit size were first wet with liquid phenol-formaldehyde reactive resin, being 20% by weight of the total resin, and then the bond including fillers was added. As filler there was 5% by volume on the bond of cryolite and 1.25% by volume of carbon black. As in the case of Example I, the abrasive wet with the plasticizer, in this case liquid resin, was placed in a mixer and then the powdered mixture of reactive phenolic resin and fillers was added, mixing was continued until the abrasive had picked up all of such powder, and then later on neutral creosote oil was added in this case in the amount of 30 cubic centimeters of neutral creosote oil per pound of resin. These wheels were cold pressed and then given a soaking bake at 140° C. By "soaking" I means they were held at the top temperature for a number of hours.

The grinding was the same kind of grinding as in the case of Example I, that is to say it was done on a standard type swing frame grinder at 9500 surface feet per minute and using 140 pounds pressure. The grinding results are shown in Table VIII wherein the wheel having the fused alumina abrasive is designated by the chemical formula $Al_2O_3$ and the wheel having the stabilized fused zirconia is designated by the chemical formulae $ZrO_2+CaO$.

TABLE VIII

| Wheel | Wheel Wear, Cubic Inches Per Hour WW | Material Removed, Pounds Per Hour MR | Quality $(MR)^2$ $\overline{(WW)}$ | Efficiency $\dfrac{MR}{WW}$ |
| --- | --- | --- | --- | --- |
| $Al_2O_3$ | 100.0 | 27.8 | 8 | .278 |
| $ZrO_2+CaO$ | 86.6 | 33.4 | 13 | .385 |

EXAMPLE III

Two identical wheels were made, that is to say identical excepting one had fused alumina abrasive and the other had the same stabilized fused zirconia as in the case of Examples I and II. In grade and structure these wheels had 48% by volume of abrasive and 52% by volume of bond, with no porosity. The wheels were 16" in diameter and 2" thick with a 6" central hole and were used to grind 18–8 stainless steel. The grit size of the abrasive was No. 16.

The bond was vulcanized rubber, that is to say crude rubber in the form of smoked sheet was provided together with sulphur, the rubber being 66.6% and the sulphur being 33.3% of the total rubber and sulphur by weight. Additional to the rubber and sulphur there was 50% by volume of cryolite. This 50% by volume of cryolite was on the total rubber, sulphur and cryolite.

The procedure for making these wheels was to take the rubber, sulphur and cryolite and first mix them in a closed rubber mixer, then transfer the rubber, sulphur and cryolite to an open kneader and mix them therein with the abrasive, then later working this material on a rubber mill, then molding and vulcanizing at 140° C.

The grinding was done with a standard type swing frame grinder at 9500 surface feet per minute using 140 pounds pressure. The grinding results are shown in Table IX wherein the wheel having the fused alumina abrasive is designated by the chemical formula $Al_2O_3$ and the wheel having the stabilized fused zirconia is designated by the chemical formulae $ZrO_2+CaO$.

TABLE IX

| Wheel | Wheel Wear, Cubic Inches Per Hour WW | Material Removed, Pounds Per Hour MR | Quality $(MR)^2$ $\overline{(WW)}$ | Efficiency $\dfrac{MR}{WW}$ |
| --- | --- | --- | --- | --- |
| $Al_2O_3$ | 92.5 | 29.8 | 10 | .322 |
| $ZrO_2+CaO$ | 76.3 | 35.4 | 16 | .464 |

EXAMPLE IV

The two wheels of Example I were used for further grinding of 18–8 stainless steel with 200 pounds pressure. In this connection the wheels were now somewhat smaller and so the peripheral velocity was somewhat less than 9500 surface feet per minute. The results were as shown in Table X.

TABLE X

| Wheel | Wheel Wear, Cubic Inches Per Hour WW | Material Removed, Pounds Per Hour MR | Quality (MR)² (WW) | Efficiency MR / WW |
|---|---|---|---|---|
| Al₂O₃ | 102.0 | 54.0 | 29 | .529 |
| ZrO₂+CaO | 91.0 | 67.0 | 49 | .736 |

EXAMPLE V

The same wheels as used in Examples I and IV were used for further grinding on cast carbon steel with 120 pounds pressure. The same swing frame grinder was used as in the case of Example I this swing frame grinder also having been used in the grinding of Example IV as shown in Table X. The wheels were now so much reduced in diameter that at the start of this grinding the peripheral velocity was 7700 surface feet per minute. The grinding results were as shown in Table XI.

TABLE XI

| Wheel | Wheel Wear, Cubic Inches Per Hour WW | Material Removed, Pounds Per Hour MR | Quality (MR)² (WW) | Efficiency MR / WW |
|---|---|---|---|---|
| Al₂O₃ | 17.3 | 19.4 | 22 | 1.12 |
| ZrO₂+CaO | 4.0 | 15.5 | 60 | 3.87 |

EXAMPLE VI

Three identical wheels were made, that is to say identical excepting one had fused alumina abrasive, another had stabilized (with 5% of lime) fused zirconia as the abrasive and the third had unstabilized fused zirconia as the abrasive. In grade and structure these wheels had zero porosity (as commercially reckoned) and 54% by volume of abrasive, wherefor the percentage of bond by volume was 46%. The wheels were 16" in diameter and 2" thick with a 6" central hole and were used to grind stainless steel, the common 18-8 variety, and also cast steel. The bond in these wheels was the same standard phenolic resin described in connection with Example I and the grit size, fillers, anti-swelling agent, cross-linking agent as well as the manufacturing procedure were all the same as set forth in Example I.

The grinding was done with a standard type swing frame grinder using 175 pounds pressure. The grinding results are shown in Table XII wherein the wheel having the fused alumina abrasive is designated by the chemical formula Al₂O₃, the wheel having the stabilized fused zirconia is designated by the formulae ZrO₂+CaO and the wheel having the unstabilized fused zirconia is designated simply by ZrO₂. The peripheral velocity of the wheels while grinding was approximately 9500 surface feet per minute and this is usually considered the best speed from all practical considerations.

TABLE XII

GRINDING STAINLESS STEEL

| Wheel | Wheel Wear, Cubic Inches Per Hour WW | Material Removed, Pounds Per Hour MR | Quality (MR)² (WW) | Efficiency MR / WW |
|---|---|---|---|---|
| Al₂O₃ | 37.0 | 34.8 | 33 | .94 |
| ZrO₂+CaO | 16.5 | 36.4 | 80 | 2.2 |
| ZrO₂ | 5.5 | 26.8 | 130 | 4.9 |

GRINDING CAST STEEL

| Wheel | Wheel Wear, Cubic Inches Per Hour WW | Material Removed, Pounds Per Hour MR | Quality (MR)² (WW) | Efficiency MR / WW |
|---|---|---|---|---|
| Al₂O₃ | 35.6 | 39.5 | 44 | 1.1 |
| ZrO₂+CaO | 10.2 | 24.0 | 56 | 2.35 |
| ZrO₂ | 3.4 | 17.2 | 87 | 5.0 |

EXAMPLE VII

Three identical wheels were made, that is to say identical except one had fused alumina abrasive, another had stabilized (with 5% of lime) fused zirconia as the abrasive and the third had baddeleyite as the abrasive. The remaining specifications of these wheels were the same as in the case of Example VI. However the grinding, which was also done with a standard type of swing frame grinder, and was also done at 9500 surface feet per minute was done at 140 pounds pressure. The grinding was done on stainless steel, the same 18-8 variety. The results were as shown in Table XIII.

TABLE XIII

| Wheel | Wheel Wear, Cubic Inches Per Hour WW | Material Removed, Pounds Per Hour MR | Quality (MR)² (WW) | Efficiency MR / WW |
|---|---|---|---|---|
| Al₂O₃ | 15.4 | 18.6 | 23 | 1.2 |
| ZrO₂+CaO | 7.4 | 25.7 | 89 | 3.47 |
| Baddeleyite | 8.3 | 10.9 | 14 | 1.3 |

I have thus shown superior grinding results when using fused zirconia abrasive bonded with phenolic resin and bonded with natural rubber bond. For the purpose of manufacturing grinding wheels there are two rubber-like materials which have physical and chemical characteristics close to natural rubber and which are used to make grinding wheels very similar to wheels made with natural rubber. These materials are respectively butadiene-acrylonitrile copolymer and butadiene-styrene copolymer. Furthermore since wheels have been made using aniline formaldehyde as the bond and since it has been found from experience that these wheels have characteristics half-way between those of the phenolic resin bonded wheels and those of the rubber bonded wheels, I can also use aniline formaldehyde resin as a bond for the manufacture of grinding wheels with fused zirconia abrasive. Accordingly the following are examples for the manufacture of grinding wheels with the above mentioned bonds.

EXAMPLE VIII

Six and four-tenths pounds of butadiene-acrylonitrile copolymer made up of about 85% butadiene and 15% acrylonitrile is mixed on rolls with 3²/₁₀ pounds of sulphur and 9⁹/₁₀ pounds of cryolite. Seven and one-tenth pounds of this bond is then mixed on rolls with 29 pounds of No. 16 grit size fused zirconia (either the stabilized or the unstabilized but preferably the unstabilized zirconia if available). This mix is then rolled into a sheet 1" thick, a 8" disc is cut therefrom and pressed in an 8" x 1" mold under a pressure of two tons per square inch at a temperature of 170° C. for one hour. This makes an excellent wheel for the grinding of stainless steel and other hard tough steels. Such wheels have practically zero porosity (because made by hot pressing).

EXAMPLE IX

For the manufacture of a grinding wheel for the same purposes as in the case of Example VIII the same procedure and the same materials can be used as in Example VIII substituting, however, butadiene styrene copolymer for the butadiene acrylonitrile copolymer wherein the copolymer is made up of 75% butadiene and 25% styrene. The porosity will also be zero.

EXAMPLE X

For the manufacture of a grinding wheel using aniline formaldehyde resin as the bond the following ingredients may be mixed,

TABLE XIV

| | | |
|---|---|---|
| No. 16 grit size fused zirconia | pounds | 29.7 |
| Powdered aniline formaldehyde resin (Cibanite) | pounds | 3.5 |
| Cryolite | do | 4.7 |
| Furfural | cubic centimeters | 350 |

Seven pounds of the above mix is spread in a mold 8" in diameter and pressed at two tons per square inch at 170° C. for one hour to make a portable snagging wheel 8" in diameter and 1" thick. The central hole can of course be as desired as is also the case for Examples VIII and IX. This makes an excellent wheel for the grinding of hard steel such as stainless steel and also the soft steels such as cast steels. Here also the wheel has zero porosity.

In the examples abrasive of No. 16 grit size has been used throughout. This is because this is one of the preferred sizes of abrasive for the manufacture of snagging wheels to grind stainless steel and cast steel and furthermore, having started with this size of abrasive it was desirable to continue the use thereof in order to maintain constant as many factors as possible in the evaluation of these abrasives in particular bonding materials. But the invention is in nowise limited to the use of any particular size of the fused zirconia and it is noted that grinding wheels having organic polymer bond of the above kinds are currently made with abrasives all the way from No. 8 grit size to No. 220 grit size and even finer. Furthermore the size and shape of wheels made in accordance with the present invention is in nowise limited. A wheel of course is round, but wheels can be made out of segments. The rubber bonded wheels for slotting steel pens have been made of a thickness only six thousandths of an inch. A 16" diameter grinding wheel is a large wheel but larger ones can be and have been made.

Nor is the invention limited to any proportions of abrasive, bond and pores. Porous wheels according to the invention can be made and will be useful. Usually 50% by volume of pores is the practical upper limit using the organic polymer bonds described and as has been seen the invention can be embodied in wheels having substantially no porosity. Following current practice the abrasive content will usually range between 40 volume percent and 60 volume percent and the bond content will usually range between 10 volume percent and 60 volume percent. In the foregoing statement everything which is not abrasive or porosity is considered to be bond, that is to say fillers and the like are calculated as bond.

While I believe the invention has its greatest utility when embodied in grinding wheels, other solid abrasive bodies can be made according to the invention, for example track grinding bricks and the like which are reciprocated for grinding.

It will thus be seen that there has been provided by this invention grinding wheels and other solid abrasive bodies in which the various objects hereinabove set forth together with many thoroughly practical advantages are successfully achieved. As many possible embodiments may be made of the above invention and as many changes might be made in the embodiments above set forth, it is to be understood that all matter hereinbefore set forth is to be interpreted as illustrative and not in a limiting sense.

I claim:

1. A solid abrasive body comprising abrasvie grains of grit size from No. 8 to No. 220 of crystalline fused zirconia bonded with thermo-irreversible organic bond selected from the group consisting of phenolic resin, aniline formaldehyde resin, natural rubber vulcanized with at least one third of its weight of sulphur, butadiene-styrene copolymer vulcanized with at least one third of its weight of sulphur, and butadiene-acrylonitrile copolymer vulcanized with at least one third of its weight of sulphur, and mixtures thereof.

2. A solid abrasive body according to claim 1 in which the abrasive grains are made of unstabilized zirconia and the crystal habit whereof is monoclinic.

3. A solid abrasive body according to claim 1 in which the abrasive grains are made of stabilized zirconia and the crystal habit whereof is cubic.

4. A solid abrasive body according to claim 1 in which the organic bond is phenolic resin.

5. A solid abrasive body according to claim 4 in which the abrasive grains are made of unstabilized zirconia and the crystal habit whereof is monoclinic.

6. A solid abrasive body according to claim 1 in which the organic bond is natural rubber.

References Cited in the file of this patent

UNITED STATES PATENTS

| | | |
|---|---|---|
| 1,340,888 | Gordon | May 25, 1920 |
| 2,270,527 | Kinzie et al. | Jan. 20, 1942 |
| 2,489,307 | Miller | Nov. 29, 1949 |
| 2,535,526 | Ballard et al. | Dec. 26, 1950 |
| 2,555,279 | Taylor | May 29, 1951 |

OTHER REFERENCES

"Uses and Applications of Chemical and Related Materials," Gregory-Reinhold Pub. Co., N. Y., 1939, p. 652.